United States Patent

[11] 3,551,603

[72] Inventor George Haugk
Glen Ellyn, Ill.
[21] Appl. No. 729,989
[22] Filed May 17, 1968
[45] Patented Dec. 29, 1970
[73] Assignee Bell Telephone Laboratories, Incorporated
Murray Hill, N.J.
a corporation of New York

[54] SWITCHING SYSTEM SCANNING ARRANGEMENT
6 Claims, 2 Drawing Figs.

[52] U.S. Cl. .......... 179/18
[51] Int. Cl. .......... H04q 3/18
[50] Field of Search .......... 179/18.6A

[56] References Cited
UNITED STATES PATENTS

| | | | |
|---|---|---|---|
| 3,073,907 | 1/1963 | Alterman et al. .......... | 179/18(.6A) |
| 3,202,767 | 8/1965 | Warman .......... | 179/18(.6A) |
| 3,420,960 | 1/1969 | Jacoby et al. .......... | 179/18(.6A) |

OTHER REFERENCES
Bell System Technical Journal, Vol. XLIII, Sept. 1964, "No. 1 ESS Scanner etc."

*Primary Examiner*—William C. Cooper
*Attorneys*—R. J. Guenther and James Warren Falk

ABSTRACT: In a switching system in which voice connections are scanned at 100 millisecond intervals, when the scanner detects an on-hook state of the line, the scanning rate is interrupted and a hit-timing interval is introduced which is an odd multiple of one-half of the total dial pulse interval, with continuation of the normal scanning rate at the end of the hit-timing interval thereby preventing disconnection when dial pulses are transmitted on the connection.

INVENTOR
G. HAUGK
BY Brendan A. Wa
ATTORNEY

1

SWITCHING SYSTEM SCANNING ARRANGEMENT

BACKGROUND OF THE INVENTION

1. Field of the Invention

This invention relates to line-scanning arrangements in automatic switching systems. More particularly, this invention relates to line-scanning arrangements which distinguish between an on-hook signal indicating disconnection of an associated station and an on-hook signal which is a portion of control signals transmitted by said station.

2. Description of the Prior Art

A principal advantage of modern switching systems is the extensive time sharing of common equipment as compared to the prior art association of individual equipment with each subscriber line. In modern systems, line circuits which detect the on-hook and off-hook state of an associated station have been replaced with scanning arrangements which scan or examine each line at predetermined intervals of time. These intervals are sufficiently brief to insure an awareness of the state of the line without providing equipment exclusive to the line.

In a typical scanning arrangement, an unactivated subscriber line is examined 10 times per second. When an off-hook state is recognized, more rapid scanning takes place (i.e., one scan per 10 milliseconds) on the assumption that digital information will be transmitted to cause completion of a voice connection to some other station. Upon completion of such a connection, the scanning equipment reinstitutes the slower scanning rate so as to detect a return to the on-hook state which is recognized as a signal to remove the linkage associated with the voice communication path.

An inherent design criteria for such scanning is the use of a rate of scanning in accordance with the nature of the information which is to be obtained from the line. Thus, the scanning of a line which has been in a prolonged on-hook state may be arranged to occur at the rate of 10 scans per second. On the other hand, upon the transmission of digital information the scanning rate is significantly increased so as to insure registration of such information without error. And finally, once the voice connection has been established, a rigid scanning rate is resumed which is less frequent than that employed during the receipt of digital information. Since the principal purpose of the voice connection scanning is to recognize when the connection has been abandoned, it has been considered desirable not to accept an initial on-hook indication as a true indication of abandonment. This is based upon the well-known prior art concern for inadvertent switchhook manipulation which results in generation of a single dial pulse. Therefore, typically in many such systems, when an on-hook condition is detected on a voice connection, the equipment is arranged to advance to a new scanning rate commonly referred to as a hit-timing interval.

For example, assume that the voice connection has been scanned at the rate of one scan per 100 milliseconds, when an on-hook condition is detected, this information is recorded in memory and a hit-timing interval is instituted which may, for example, be 200 milliseconds. If an on-hook condition is again detected, it is recognized as a confirmation that the voice connection has, in fact, been abandoned. Accordingly, the common control equipment institutes release of the associated voice connection.

A problem presented in such prior art arrangements is the fact that from time to time a telephone subscriber will inadvertently transmit a series of control signals on an existing voice connection. Of even greater concern is the fact that a voice connection through such a switching system will often extend to another office where terminal equipment is provided to receive control signals transmitted by the calling station over the existing voice connection. Where the control signals constitute a sequence of on-hook and off-hook states of a subscriber line (i.e., dial pulses), it is obvious that where a scan occurs during the on-hook state the result is to detect this as a possible disconnection of the associated station. Thus, when the hit-timing interval is instituted, the subsequent scan may readily occur during a subsequent on-hook state of the line thus "confirming" abandonment of the connection. However, in actuality, the subsequent on-hook state may well be merely a further portion of the same series of control signals (i.e., a dial pulse train) which provided the initial on-hook indication. The net result in such circumstances is the disconnection of the existing voice connection with resultant inefficiency and confusion. Accordingly, a need exists in the art for an arrangement which will permit line scanning of an existing voice connection and which is operable to distinguish between a disconnection of an associated station and signals which mimic such disconnection which, in reality, constitute control signals transmitted over the connection.

SUMMARY OF THE INVENTION

In the exemplary embodiment, means are provided for scanning a voice connection involving 10-pulse-per-second dial pulse telephone stations at the rate of one scan per 100 milliseconds. When an on-hook state of the line is detected, the scanning at the 100 millisecond rate is stopped and a hit-timing interval is instituted which interval is determined by the formula $n \times \frac{a}{2}$ milliseconds, where $n$ is an odd number and where $a$ is the value of the on-hook interval plus the off-hook interval of a dial pulse. The specific hit-timing interval utilized is 150 milliseconds. At the end of the hit-timing interval, if an on-hook state is again detected, disconnection of the voice connection proceeds in the conventional manner. However, where an off-hook state is detected, conventional scanning at 100 milliseconds is reinstituted with the result that such line scanning has thus been shifted to the off-hook state of any dial pulses currently being transmitted by a connected station.

In accordance with one feature of my invention, a scanning arrangement is provided wherein information manifested by opens and closures of an existing voice communication circuit may be utilized without causing disconnection of an associated station.

Another feature of my invention is the provision of a line-scanning arrangement operable to detect abandonment of a voice connection as manifested by an on-hook signal of a station associated with the connection with the same degree of speed as that which exists in the prior art, but with a significantly higher degree of certitude.

In accordance with still another feature of my invention, the foregoing may be accomplished in existing switching systems without complex changes in existing circuitry.

BRIEF DESCRIPTION OF THE DRAWING

The foregoing objects, features and advantages, as well as others of the invention will be more apparent from a description of the drawing, in which.

The present invention is illustrated in an electronic-controlled telephone system of the type disclosed in Volume XLIII No. 5 of the Bell System Technical Journal dated Sept. 1964 and entitled "No. 1 Electronic Switching System." For the description of the operation of components of the exemplary embodiment not described herein in detail, the aforesaid publication may be consulted.

Figure 1:
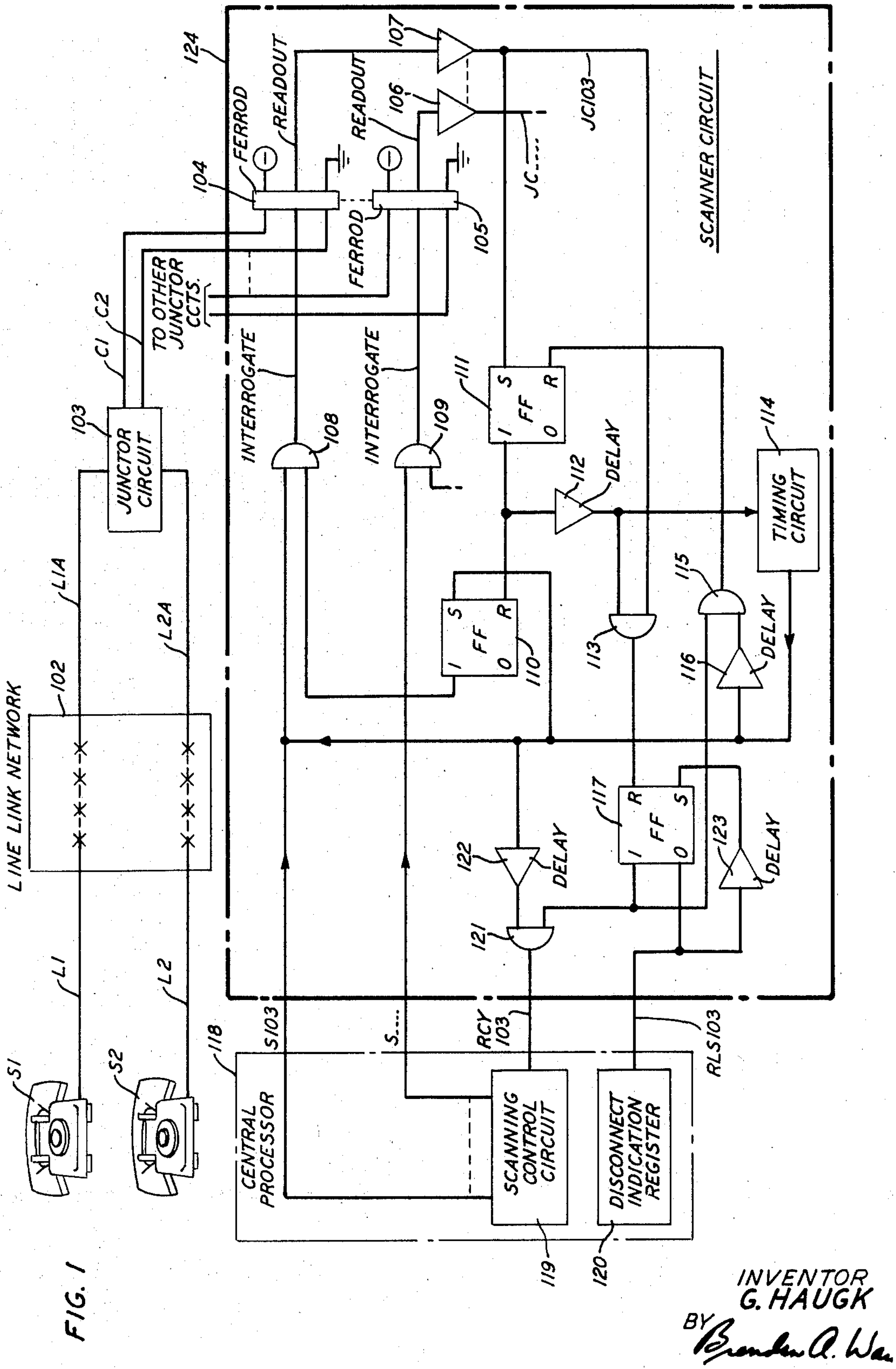
FIG. 1 is a schematic diagram showing the interrelation of the exemplary embodiment of the invention.

It is intended that certain components shown in FIG. 1, namely, line link network 102, junctor circuit 103, and central processor 118 shall be essentially the same as the correspondingly designated equipment in the aforesaid publication. The invention set forth herein is concerned principally with scanner circuit 124, which is shown with heavy lines in FIG. 1 in order to distinguish it from the other circuit blocks which are neither discussed nor described in detail herein except where necessary for a complete understanding of the invention.

DESCRIPTION

Referring now to FIG. 1, we shall assume that an intraoffice connection has been extended between stations S1 and S2 via line link network 102 and junctor circuit 103. We shall further assume that each of the stations is equipped with a 10-pulse-per-second dial pulse transmitting mechanism. We shall also assume that at this point in time a continuous voice communications path extends between the two stations both of which are presently in an off-hook state.

As set forth in the earlier cited publication, junctor circuit 103 comprises but one of a number of equivalent circuits which are provided to interconnect calling and called stations. Although the following description will pertain to the manner in which scanning of these junctor circuits takes place, it will be obvious to those skilled in the art that the instant invention is equally applicable to those circuits which serve the same purpose as the junctor circuit with respect to outgoing, incoming, tandem and toll calls extending between telephone stations.

In a manner set forth in the earlier cited publication, the central processor 118 is arranged to cause the scanning of all existing voice connections at the rate of one scan per 100 milliseconds. Scanning control circuit 119, which is shown within circuit block 118, symbolically represents the well-known apparatus and equipment necessary to accomplish the aforesaid scanning. In similar fashion, disconnect indication register 120, which is also shown within circuit block 118, symbolically represents the well-known apparatus necessary to effect disconnection of the linkage path associated with a particular junctor circuit upon a disconnect indication being received from scanner circuit 124.

Ferrod 104 in scanning circuit 124 is shown associated with junctor circuit 103 and is provided to sense the state of the linkage path which extends between stations S1 and S2 in a manner well known in the art and specifically in the manner set forth in the earlier cited publication at page 2257. Thus, in response to a pulse being applied to the interrogate winding, a voltage is induced in the readout winding. A significantly higher voltage is provided on the readout winding when the control windings C1 and C2 are not energized (namely, when the associated voice connection is in an open circuit state).

Proceeding now with the description, we shall assume that central processor 118 causes a scanning pulse to be applied to lead S103 at this time. The pulse is thus applied to the upper terminal of AND gate 108 which is uniquely associated with ferrod 104. It will be noted that flip-flop 110 is presently in its normal state and further that the normal state of flip-flop 110 provides a potential on the lower terminal of AND gate 108 such that in response to the signalling pulse on the upper terminal, AND gate 108 is enabled. Accordingly, the interrogate lead which extends from AND gate 108 to ferrod 104 is enabled this time. If we were to assume that junctor circuit 103 is in an activated condition, the state of ferrod 104 will result in a very low voltage output on the readout lead in response to the signal present on the interrogate lead. However, for purposes of the embodiment, we shall assume that the subscriber at station S1 has caused an on-hook state to be imposed upon the communications path extending between the two stations via junctor circuit 103. Thus, control leads C1 and C2 of ferrod 104 are not presently energized. Accordingly, when ferrod 104 is interrogated, a comparatively high voltage output is provided on the readout lead which extends from ferrod 104, with the result that amplifier 107 is enabled at this time.

Upon the enabling of amplifier 107, flip-flop 111 is enabled from the signal present on the S terminal. The output of amplifier 107 is also impressed on the lower terminal of AND gate 113. However, no enabling of AND gate 113 takes place at this time since the output lead from flip-flop 111 is impressed on the upper terminal of AND gate 113 only after a suitable delay interval imposed by delay amplifier 112. At the end of this interval, the readout pulse from amplifier 107 is no longer present on the lower terminal of AND gate 113, while, of course, the upper terminal remains in an enabled condition.

The output of flip-flop 111 is further extended to cause the resetting of flip-flop 110 at this time thereby changing the potential on the output of flip-flop 110 which extends to the lower terminal of AND gate 108. The changing of potential on the aforesaid conductor effectively inhibits the operation of AND gate 108 with respect to any subsequent scanning pulses present on lead S103.

Timing circuit 114 is enabled at this time by the potential extended from the output of delay amplifier 112. Timing circuit 114 may comprise any number of configurations well known in the art operable to provide an output pulse in response to the enabling of the input after a predetermined interval of time. In the instant embodiment, since we have assumed that 10-pulse-per-second dial telephone stations are involved, this interval may advantageously be selected to be 150 milliseconds. The selection of the 150 millisecond interval is in accordance with the requirement that it be derived by ascertaining an odd multiple of the sum of the on-hook interval plus the off-hook interval of a dial pulse divided by 2. Each of the dial pulses in the instant embodiment are constituted by a 50 millisecond on-hook interval in sequence, and a multiplication factor of three has been selected for purposes of the embodiment.

Proceeding now with the description; at the end of the 150 millisecond interval an output pulse is provided by timing circuit 114 thus restoring flip-flop 110 to normal which, in turn, restores the lower terminal of AND gate 108 to its enabled state. The output of timing circuit 114 also enables the upper terminal of AND gate 108 resulting in its operation at this time, thereby pulsing the interrogate lead to ferrod 104 in a manner similar to that hereinbefore described.

It will be noted that this most recent scanning pulse is being applied 150 milliseconds after the prior scanning pulse which resulted in an indication of an on-hook state of the communications path extending between stations S1 and S2. We shall assume that the initial scanning indication resulted from detection of the initial open state of the line caused by the transmission of a series of 10 dial pulses (digit "zero") over the voice connection path.

It will thus be obvious that this most recent scanning pulse will occur during the off-hook state of the second dial pulse being transmitted on the line. Accordingly, the output on the ferrod 104 readout lead will be insufficient to enable amplifier 107 at this time.

For reasons which will be apparent from that which is contained hereinafter, delay amplifiers 116 and 122 have been selected to provide a delay interval sufficient to permit circuit response in the event that amplifier 107 was, in fact, enabled at this time. However, in view of the absence of the enabling of amplifier 107 at this time, the output of timing circuit 114 is impressed through delay amplifier 122 to cause the enabling of AND gate 121. The enabling of AND gate 121 places a potential on lead RCY103 which provides an indication to cause scanning control circuit 119 to recycle in the well-known manner, thus reinstituting scanning of the communication circuit associated with junctor 103 at 100 millisecond intervals of time.

The output of timing circuit 114 is also extended through delay amplifier 116 to enable AND gate 115 at this time, thus resulting in the resetting of flip-flop 111. Having completed its function, we shall assume that timing circuit 114 is arranged as well known in the art to restore to normal immediately after providing the aforedescribed output pulse at the end of the 150 millisecond timing interval. It will thus be obvious that the circuitry in scanner circuit 124 is now restored to normal in preparation for the recognition of an on-hook condition when it again occurs.

Assume for purpose of explanation that, upon the initial detection of the on-hook state of the aforesaid communications path that the subscriber at station S1 (or S2) was not, in fact, transmitting dial pulses, but, in fact, had abandoned the connection. Upon the enabling of timing circuit 114, as above set forth, the result would then be to cause a pulse on the readout lead from ferrod 104 which would be sufficient to enable amplifier 107. The enabling of amplifier 107 in this manner impresses a potential on the lower terminal of AND gate 113 as hereinbefore described.

In view of the existence of a potential on the upper terminal, as earlier set forth, AND gate 113 is enabled resulting in the resetting of flip-flop 117 at this time. The resetting of flip-flop 117 inhibits the enabling of AND gate 121, as earlier described, and concurrently therewith impresses a potential on the RLS 103 conductor to disconnect indication register 120 to cause the release of the linkage connection associated with junctor circuit 103 in the well-known manner. The output of flip-flop 117 is also extended to AND gate 115 to prevent the enabling of that gate as earlier described, in view of the fact that flip-flop 111 has already been reset from the second scanning pulse provided from readout amplifier 107. The reset output of flip-flop 117 is connected to its set input via delay amplifier 123. Thus, at this point in time, in response to the continued on-hook state of the communications path extending between stations S1 and S2, a release function has been initiated in central processor 118 and the circuitry and scanning circuit 124 has returned to normal so as to be available for use in subsequent connections.

Figure 2:
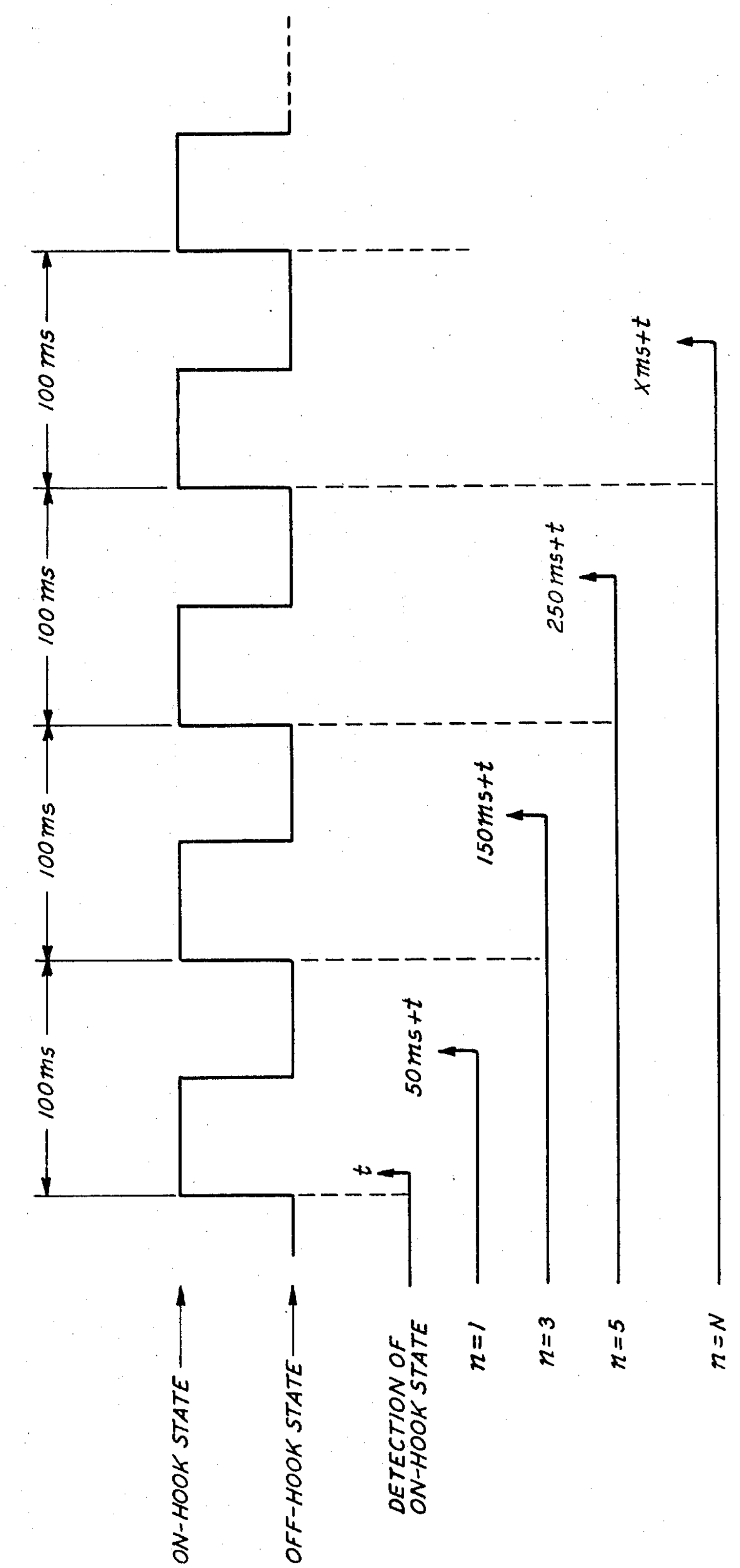
FIG. 2 is a state sequence chart depicting the function of my invention with respect to a particular train of dial pulses present on a voice connection.

In summarizing, reference will now be made to FIG. 2. This FIG. portrays a train of dial pulses each of which, of course, comprises an on-hook state followed by an off-hook state. For purpose of explanation, the total dial pulse interval is assumed to be 100 milliseconds based upon the use of conventional 10-pulse-per-second dial pulse stations. In prior art scanning systems, the problem which is solved by the instant invention arises at that point in time at which the on-hook state of a dial pulse is first recognized. In FIG. 2, this point in time is identified by *t*. As earlier stated herein, the scanning apparatus may be effectively rendered unresponsive to such dial pulses by selecting a hit-timing interval which is an odd multiple of the duration of the dial pulse on-hook state. It will thus be obvious from an inspection of FIG. 2 that if a multiple of "1" is utilized, a hit-timing interval of 50 milliseconds will be employed thereby causing the subsequent hit-timing scan to occur at a point in time identified as 50 milliseconds + *t* or, in other words, in the off-hook state. Thus, when conventional scanning is resumed at the conventional even multiple of the dial pulse rate (100 milliseconds, 200 milliseconds, etc.), future scanning of the dial pulse train will always occur during the off-hook state of each dial pulse. A visual inspection of FIG. 2 will reveal that for other multiples, such as 3, 5 and so forth, the same advantages will accrue.

While the equipment of my invention has been disclosed in an arrangement whereby scanning of a voice connection is interrupted upon detection of an on-hook state so as to interpose an interval of time equal to an odd multiple of the on-hook interval of a dial pulse, it is to be recognized that numerous other arrangements may be devised by those skilled in the art without departing from the spirit and scope of my invention.

I claim:

1. In a telephone system:

a line;

means for scanning said line at a predetermined rate to detect an open state of said line; and means responsive to the detection of said open state for interposing an interval of time in said scanning equal to an odd multiple of one-half of a dial pulse interval.

2. The combination set forth in claim 1 wherein said scanning means is responsive to the presence of a closed state of said line after said interposed interval of time for continuing said scanning at said predetermined rate.

3. In a telephone system:

a subscriber line having a communication path connected thereto;

means for scanning said line at a predetermined rate to detect an open state of said line;

means responsive to repeated detection of a said open state of said line for releasing said connected communication path; and means responsive to the initial detection of a said open state for interposing an interval of time in said scanning equal to an odd multiple of one-half of the sum of the open interval and the closed interval of a dial pulse to thereby prevent enabling of said releasing means when dial pulses are present on said line.

4. In a telephone system, a subscriber line;

means for scanning said line to detect open and closed states, said scanning occurring at intervals equal to a multiple of the dial pulse rate when said line is in a talking condition;

means responsive to the detection of a said open state for changing the rate of scanning to cause said scanning next to occur upon expiration of an interval of time equal to an odd multiple of one-half the sum of the duration of the open state and the closed state of a dial pulse; and means responsive to detection of said closed state for thereupon continuing said scanning at intervals equal to a multiple of the dial pulse rate, whereby said scanning of the line thereupon continues only during the closed states of dial pulses.

5. In a telephone system:

a line having a communication path connected thereto;

means for generating a sequence of dial pulses on said line each comprising an open state and closed state of said line;

means for scanning said line at intervals which are a multiple of said dial pulse rate;

means controlled by said scanning means responsive to repeated open states of said line for releasing said connected communication path;

means for rendering said scanning means insensitive to dial pulses generated on said line comprising;

means for detecting the open state of a dial pulse on said line; and means for interposing in said scanning an interval of time equal to an odd multiple of one-half of the sum of the duration of said open state and said closed state.

6. In a telephone system:

a line in having a communication path connected thereto;

means for generating on said line a series of uniform signals of predetermined duration each comprising a sequence of an open and a closed state of said line;

means for scanning said line at intervals which are a multiple of the said duration of said signals, means controlled by said scanning means responsive to repeated open states of said line for releasing said communication path; and means for rendering said scanning means insensitive to said signals comprising:

means for detecting an open state of said line; and means controlled by said detecting means for interposing in said scanning an interval of time equal to an odd multiple of one-half of the duration of said signal.